United States Patent [19]

Miller

[11] 4,210,013

[45] Jul. 1, 1980

[54] PRESS WITH LOAD TRANSFER MECHANISM

[75] Inventor: Donald E. Miller, Mt. Prospect, Ill.

[73] Assignee: The Continental Group, Inc., New York, N.Y.

[21] Appl. No.: 959,117

[22] Filed: Nov. 13, 1978

[51] Int. Cl.² .............................................. B21D 22/20
[52] U.S. Cl. ...................................... 72/347; 72/358; 100/214
[58] Field of Search .................. 72/347, 351, 352, 353, 72/354, 358, 450, 453.01, 453.18; 100/264, 214; 74/100, 104; 425/352, 354

[56] References Cited

U.S. PATENT DOCUMENTS

| | | | |
|---|---|---|---|
| 1,953,314 | 4/1934 | Rode | 72/465 |
| 2,417,794 | 3/1947 | Werner | 72/432 |
| 3,108,502 | 10/1963 | Chatfield | 72/397 |
| 3,138,257 | 6/1964 | Anderson | 72/267 |
| 3,861,191 | 1/1975 | Sato | 72/334 |

Primary Examiner—Francis S. Husar
Assistant Examiner—Gene P. Crosby
Attorney, Agent, or Firm—Charles E. Brown

[57] ABSTRACT

A forging press having a mechanical load transfer mechanism in the form of a motion and force multiplying lever arrangement and linkage between a press load beam and the press ram so that forces applied to the load beam through the tooling from the ram are transferred to the ram to aid the ram in its downward forging movement. A suitable lost motion linkage is provided which permits the ram to move away from the load beam after the load beam has stopped in its upstroke position to effect the removal of a formed article.

24 Claims, 8 Drawing Figures

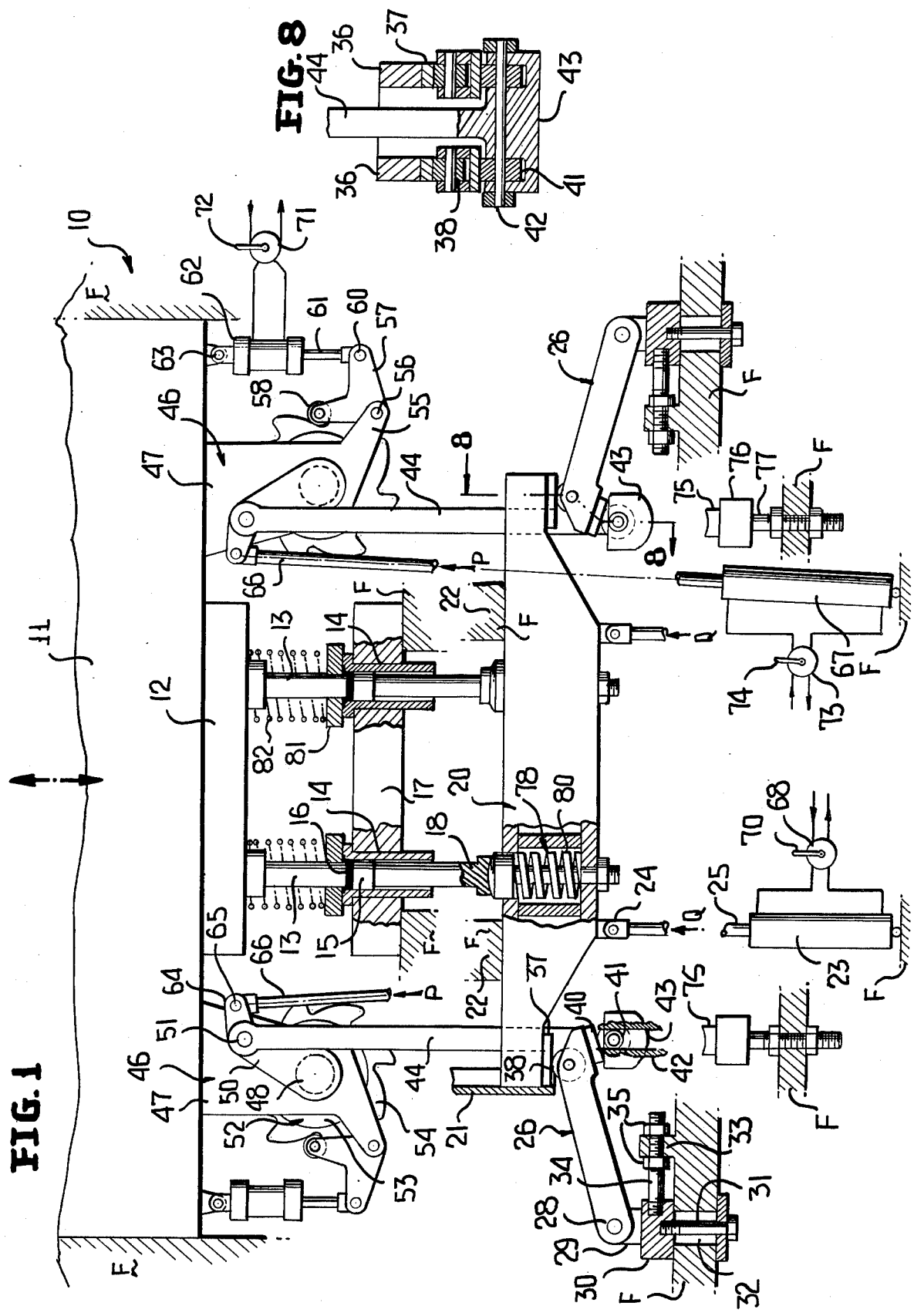

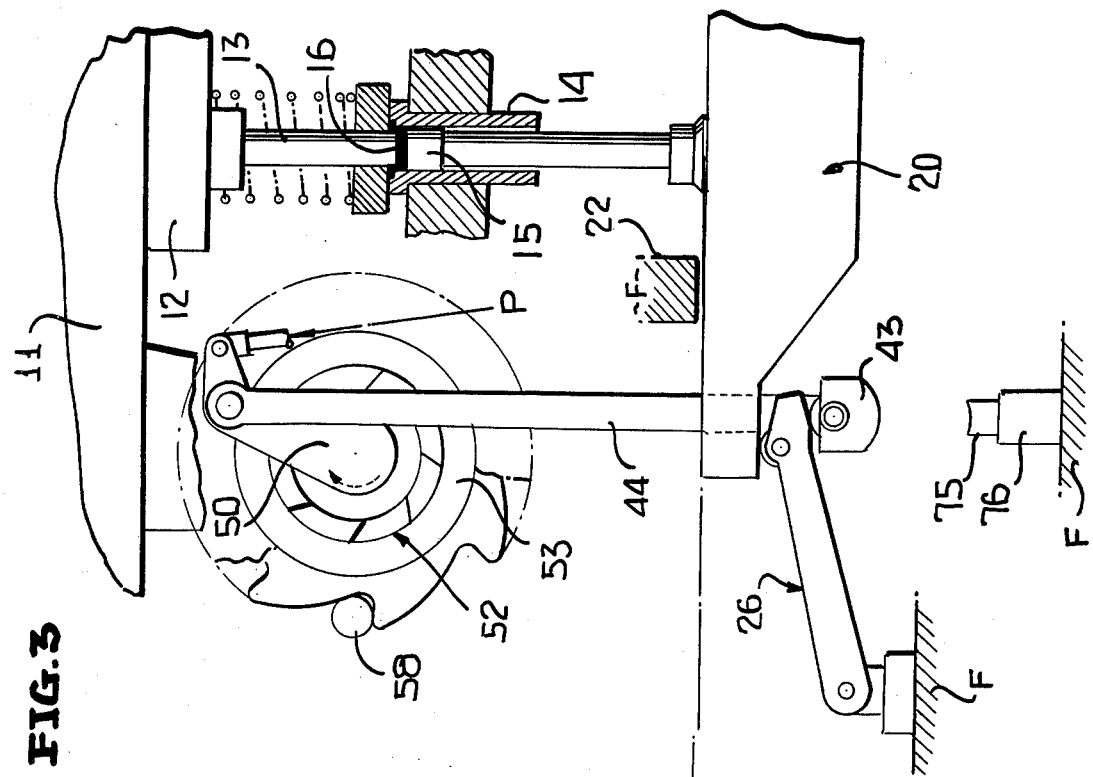
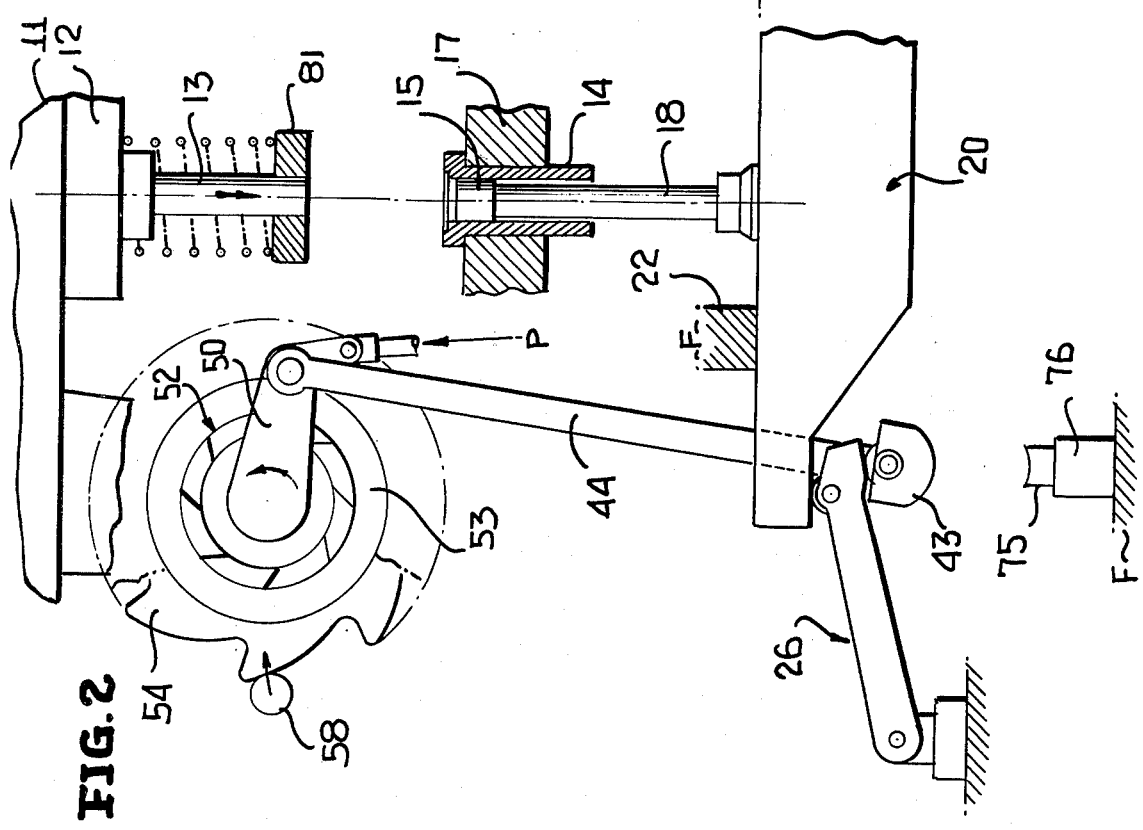

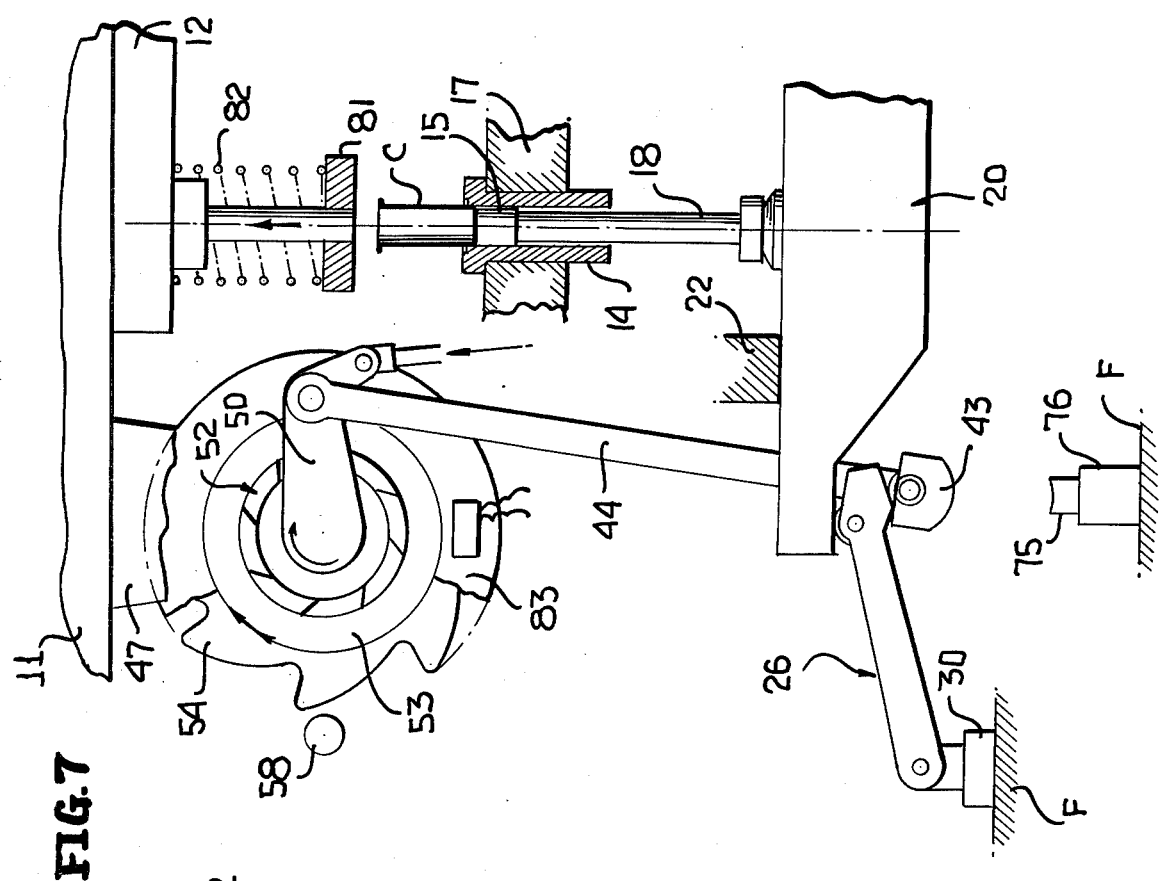
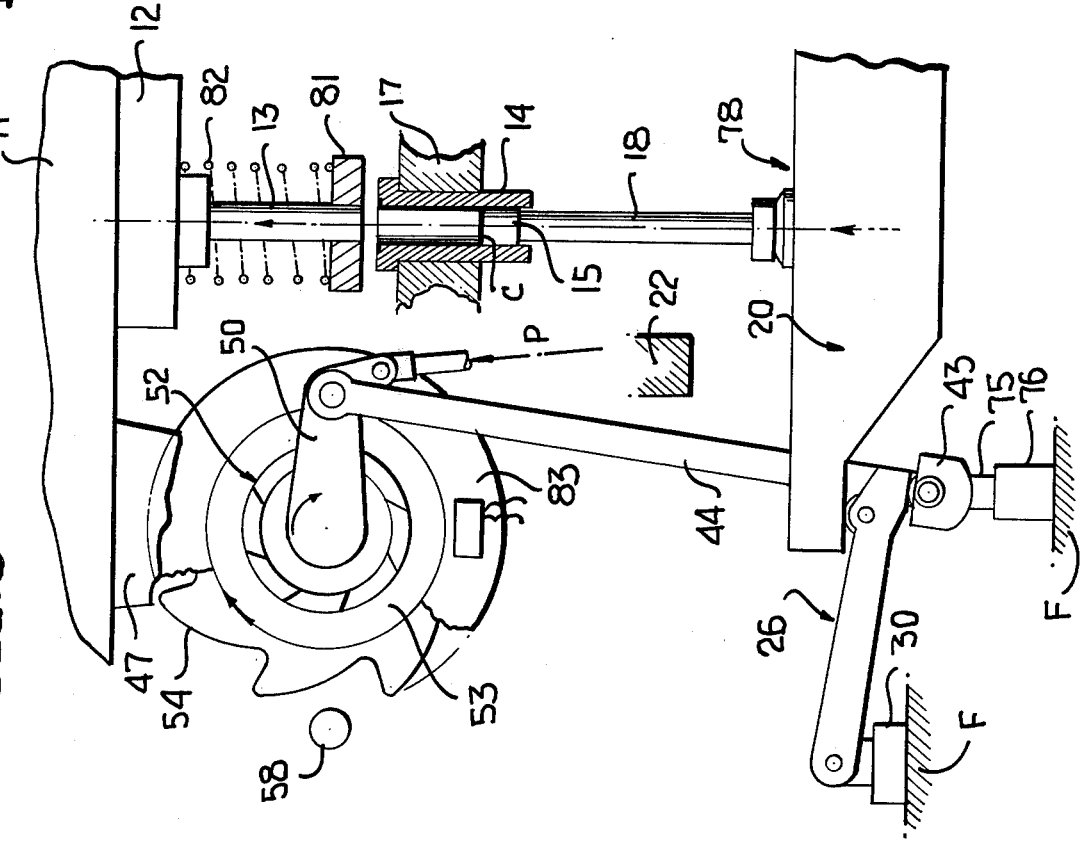

PRESS WITH LOAD TRANSFER MECHANISM

This invention relates in general to new and useful improvements in press arrangements, and more particularly to a press arrangement for forging a slug into an elongated cylindrical member with there being a travel of the press elements corresponding substantially to the length of the cylindrical member formed from the slug.

Most particularly, this invention relates to a press arrangement wherein the load beam is mounted for movement relative to and with the ram and with the force applied to the load beam from the ram through the press tools and the slug being forged being transmitted back to the ram to effect a drawing of the ram toward the load beam at a rate slightly greater than the rate of movement of the load beam.

In accordance with this invention, by transferring the force applied to the load beam by the ram through the tool pack to the ram as a pulling force, minimal force is required to actuate the ram and, accordingly, a press with a normal capacity much less than that which would be required without the load transfer can be utilized.

In accordance with this invention, the load beam is mounted on a pair of lever assemblies at each end and the lever assemblies are, in turn, connected to the ram through linkage. The relationship of the load beam, lever assemblies and linkage being one wherein a movement of the ram at a predetermined greater rate than that of the load beam can be effected with substantially all of the force transmitted to the load beam being returned to the ram to effect the necessary forging operation.

A particular feature of the invention is the construction of the load transferring linkage which includes slack take-up means whereby a punch carried by the ram may move to a fully retracted position to facilitate the removal of a formed tubular member and wherein the ram is free to move toward the load beam until such time as a slug to be forged is engaged by the tooling of the press, at which time the load beam becomes positively coupled to the ram for the transfer of the load from the load beam to the ram.

This invention also includes such features as the connection of the lower tooling (pad) to the load beam through a spring assembly wherein the energy of the moving ram can be momentarily absorbed by the load beam as the tools engage the workpiece and wherein the load beam may be rapidly accelerated until its speed approaches that of the ram.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic elevational view of a press incorporating therein the load transfer system of this application, parts being broken away and shown in section.

FIG. 2 is a schematic elevational view of the press of FIG. 1 at the start of the operating stroke thereof.

FIG. 3 is a schematic view similar to FIG. 2 wherein the punch of the tooling has just engaged the slug and forging has been initiated.

FIG. 6 is a fragmentary schematic view similar to FIG. 2 showing the punch having retracted from the formed workpiece.

FIG. 7 shows the load beam having returned to its starting position with the formed workpiece being ejected from the associated die.

FIG. 8 is an enlarged fragmentary sectional view taken generally along the line 8—8 of FIG. 1, and shows the details of the load transferring leverage assembly.

Figure 5:
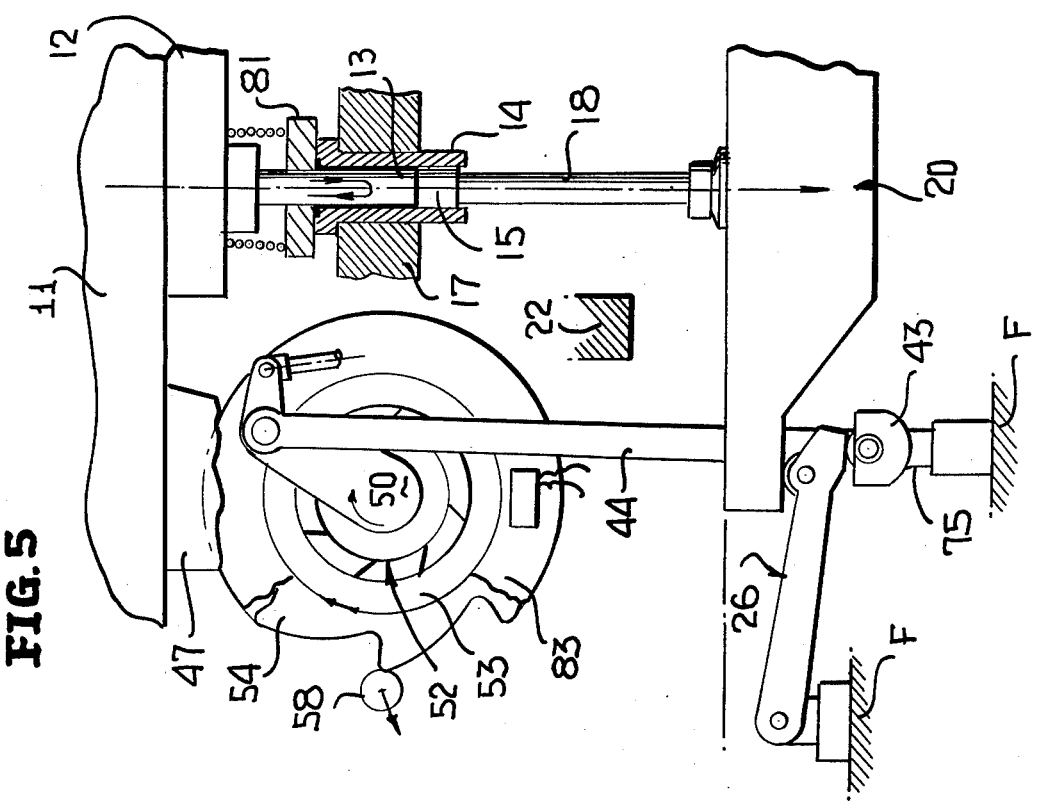
FIG. 5 is another schematic view similar to FIG. 2 showing the ram after it has passed through the bottom dead center position and has begun its return stroke.

Referring now to the drawings in detail, it will be seen that there is schematically illustrated in FIG. 1 a press formed in accordance with this invention. The press, which is generally identified by the numeral 10, includes a rigid frame F of which only portions are schematically illustrated sufficient for there to be a proper understanding of the invention.

The frame F carries a ram 11 which is mounted for reciprocation within the frame as is clearly shown by the arrow in FIG. 1. It is to be understood that the ram 11 is to be reciprocated in any desired manner and is preferably driven by a conventional press structure of the type which includes a rotating crankshaft having a flywheel thereon and wherein the crankshaft is coupled by a connecting rod to the ram. The movement of the ram 11 is restricted to straightline reciprocating movement by the nature of the mounting thereof within the frame F.

The ram 11 carries the usual tool mounting head 12 and in the illustrated embodiment of the invention, the head 12 carries two punches 13, although a single punch or a greater number of punches may be carried by the head 12.

Each punch 13 is associated with a tubular die 14 cooperable with the punch 13 and an associated pad 15 for forming an elongated tubular member having an integral end wall with the tubular member being formed from a slug 16 of forgable material including metal, plastics, etc.

In the illustrated embodiment of the invention, the dies 14 are carried by a support 17 which, in turn, is fixedly carried by the frame F. The dies 14 are, of course, positioned in alignment with the path of movement of the respective punch so that the punch may pass therethrough during the formation of the tubular article.

Each pad 15 is supported within the respective die 14 by an upstanding support 18. The supports 18 are carried by the load beam 20.

The load beam 20 may be of any desired construction but is specifically illustrated as being of a box construction and has the opposite end portions mounted within suitable vertical guides 21 which permit vertical movement of the load beam with the ram 11 along a predetermined path.

The load beam 20 is not fixed relative to the frame F as is customary, but is, instead, floatingly mounted within the guides 21. The load beam assembly is initially held upwardly against top stops 22 which conveniently may be parts of the frame F. The upwardly directed force required to hold the load beam against the top stops may be provided for by simple fluid cylinders 23 or any other desired devices. The fluid cylinders 23 are mounted on portions of the frame F and are connected to the underside of the load beam 20 by means of pivotal connections 24 between the load beam and piston rods 25 of the cylinders 23.

The remote ends of the load beam 20 are mounted on lever assemblies 26. Each lever assembly 26, as is best shown in FIGS. 1 and 8, includes a lever 27 which is pivotally carried by a pivot shaft 28. The pivot shaft 28 is carried by ears 29 supported by a block 30. The block 30 is selectively shiftable toward and away from the center axis of the press 10 being mounted on a supporting surface of the frame F and by being held down by means of one or more hold-down bolts 31 which pass through a transversely elongated opening 32 in a respective part of the frame F. The frame F is provided with a shoulder 33 through which an adjusting bolt 34 passes and which carries suitable positioning nuts 35. The transverse elongation of the opening 32 permits the pivot shaft 28 to be shifted toward and away from the center of the press 10.

As is best shown in FIG. 8, the load beam 20 is formed of two side plates 36 with each of these side plates having end portions of a reduced height and being provided on the undersurface thereof with a hardened steel plate 37. Each hardened steel plate 37 is engaged by an underlying roller or follower 38 of an associated lever 27 in the manner best shown in FIG. 8. Thus, the load beam 20 rests upon the followers 38 carried by the levers 27.

Each lever 27 has secured to the underside thereof a hardened steel plate 40 which rests upon a roller or follower 41 carried by a shaft 42. The shaft 42 is carried by a base portion 43 of a connecting rod 44.

It is to be understood that the base portion or lower end of the connecting rod 44 at each end of the load beam is to be mounted for vertical movement along a fixed path. Any suitable type of guide means may be utilized, but in the illustrated embodiment of the invention there has been schematically illustrated a guide 45 which is fixed relative to the frame F and which has engaged therewith an associated one of the rollers 41.

The upper end of each connecting rod 44 is coupled to the ram 11 by way of a lost motion connection generally identified by the numeral 46. Each lost motion connection 46 includes a pair of spaced brackets 47 in which there is journalled a crank pin 48. A crank 50 is carried by the crank pin 48 and has pivotally connected thereto by means of a pin 51 the upper end of the respective connecting rod 44.

The crank pin 48 is secured to the crank 50 for rotation therewith and is also secured to an inner race of a conventional overrunning clutch assembly 52 which may be of the sprag type. The clutch 52 has an outer race 53 which carries a toothed lock-wheel 54.

The brackets 47 have lower extensions 55 which carry a pivot pin 56 on which a crank 57 is pivotally mounted. One arm of the crank 57 carries a locking roller 58, while the other arm of the crank carries a pin 60 which secures a piston rod 61 of a fluid cylinder 62 to the crank 57. The fluid cylinder 62 is mounted on the underside of the ram 11 by a pivot 63.

Each of the cranks 50 is provided with an extension 64 which carries a pivot pin 65 which pivotally connects to the crank extension an upper end of a piston rod 66. The lower end of each piston rod 66 is part of a fluid cylinder 67 which is pivotally mounted on a portion of the frame F.

At this time it is pointed out that the fluid cylinders 23 are controlled by a suitable valve 68 which has an actuator 70. The fluid cylinders 62 are controlled by a similar valve 71 having an actuator 72, and the fluid cylinders 67 are controlled by a valve 73 having an actuator 74.

Aligned with the base portion 43 of each of the connecting rods 44 is a bottom stop 75 which is carried by a shock absorbing unit 76 which, in turn, has a support 77 which is vertically adjustably mounted on a portion of the frame F.

The press construction also includes a spring-pack connection between each pad support 18 and the load beam 20. The spring-pack assembly is generally identified by the numeral 78 and includes a suitable spring unit 80, either in the form of a coil spring or a stack of Belleville washers which are preloaded.

Finally, when the tubular product being formed is to have a flange, there is associated with each punch 13 a flange clamp 81 which moves with the associated punch 13, but is engageable with the upper end of the die 14 and thereafter remains stationary while the punch 13 continues its forging stroke. For purposes of illustration, each flange clamp 81 is shown as being carried by a spring 82.

OPERATION

First of all, it is to be understood that the load beam 20 is mounted within the guides 21 in a manner so as to allow vertical movement and slight tipping. That is, during vertical displacement of the load beam, one end can be moderately higher or lower than the other end. No other movements of the load beam are permitted.

Because of the high loads imposed upon it, the load beam 20 must be constructed sturdily. It is therefore quite heavy. As a result, the weight of the beam can cause difficulties and for this reason the pneumatic cylinders 23 are used to provide counterbalance forces Q.

The fluid cylinders 23 are also used during automatic mode operation of the press to help cushion the end of the beam upstroke.

It will be readily apparent from FIG. 1 that the forging load is transferred by the ends of the load beam to the multiplying-levering assemblies 26 by way of the cam follower rollers 38. As is clearly shown in FIG. 8, each lever 27 has the form of a yoke, with each arm of the yoke containing one of the rollers 38.

By mounting each of the lever assemblies 26 on the press frame F for adjustment, the motion multiplying factor of each lever assembly 26 can be increased by shifting the mounting toward the outside of the press, or decreased by shifting the mounting toward the center of the press.

As the press begins its downstroke, as shown in FIG. 2, the lock roller 58 has already started to engage and is driving the lock-wheel 54 and sprag clutch outer race 53 in a clockwise direction. The fluid cylinders 67 exert an upwardly directed force P on the cranks 50, and the connecting rods 44 act to hold the load beam 20 against the top stops 22. As a result, the downward motion of the ram 11, the cranks 50 and sprag clutch inner races rotate in a counterclockwise direction. The forces resisting the foregoing motions are very low, consisting for the most part of the overrunning drag and seal friction of the sprag clutches 52.

A slug feed unit (not shown) places a slug 16 on each of the pads 15 as the downstroke of the ram 11 occurs. At some time before the punch 13 engages the respective slug 16, the lock rollers 58 become fully engaged with the lock-wheels 54, thereby preventing further clockwise rotation of the outer races 53 of the sprag clutches 52. Counterclockwise rotation of the cranks 50 continues until the cranks approach the position shown in FIG. 3.

The speed of the ram 11 has increased substantially in the interval between the illustration of FIGS. 2 and 3. In FIG. 3, the speed of the ram 11 is at or near its peak. Furthermore, the crank/connecting rod geometry has become one in which a small increment of ram motion causes a relatively large change in crank angle. As a result of these factors, the approach to the condition of FIG. 3 requires a very high angular acceleration of the cranks 50. Most of the force P is used at this time to ensure that the required acceleration will take place. Only a small portion of the force P remains available to maintain upward loading on the connecting rods 44 and the load beam 20. However, only a small force is needed at this time because the weight of the beam, spring-pack and pad is counterbalanced by the forces Q.

At the onset of the container formation, each punch 13 drives into the respective slug 16, causing the slug to spread over the top of the die cavity. As soon as the top of the die cavity has been filled, each punch 13 attempts to drive the respective pad downwardly at ram velocity. However, the load beam assembly is quite massive and weighs about 1500 pounds. Further, any downward displacement of the load beam requires that the ends of the multiplying lever assembly 26 and the connecting rods 44 also move downwardly. These components present high inertial resistance to a rapid change in velocity, i.e. a change from zero speed to ram downstroke speed. Therefore, the incipient downward travel of each pad 15 deflects its respective spring-pack 78 and the load beam 20 without causing significant displacement of the load beam as a whole. As previously stated, the spring packs 78 are heavily pre-loaded, e.g., 10/20 tons, and have a very high spring constant. Likewise the load beam has a high bending stiffness. In consequence, the initial deflection of the spring packs and the load beam is accompanied by an enormous increase in force in the punch-slug-pad-beam system.

This force more than suffices to initiate the container forging process, i.e., flange formation and the start of sidewall formation. It also imposes an extremely high acceleration on the order of 12 g or more on the load beam 20 so that the beam very rapidly approaches the velocity of the ram 11. However, as long as the load beam velocity remains well below ram speed, further deflection of the spring packs 78 will occur, and the force will continue to rise, which causes acceleration of the load beam to increase to an even higher value than the initial acceleration of 12 g.

When the velocity of the load beam 20 attains about 90% of the velocity of the ram 11, the multiplying lever assemblies 26 will have caused the lower ends of the connecting rods 44 to reach ram speed, which requires that rotation of the cranks 50 be brought to a stop. Further, as the beam speed attempts to increase, the connecting rods will try to rotate the cranks 50 in the opposite direction, i.e., a clockwise direction. The sprag clutches 52 will not permit rotation of the cranks in this direction, and therefore the cranks become locked in the position shown in FIG. 3. A high force develops in each connecting rod 44 which, multiplied by the respective lever assembly 26, balances the force transmitted from the punches through the slugs and pads to the load beam. Acceleration of the load beam now ceases.

During the remainder of the container forging, the load beam travels at a speed governed by the effective ratio of the multiplying lever assemblies. This ratio changes slightly as a result of the geometric changes which occur as the lever assemblies swing toward a horizontal position and therebeyond. However, the ratio is such that at all times it provides a difference in displacement between the ram and the load beam which ensures that adequate loading will be present. The forces P are removed during this portion of the downstroke in any conventional manner such as by actuating the valve 71 through engagement of the lever 72 thereof by a part of the press, such as the ram 11 or the load beam 20.

The initial stage of container forging during which the load beam 20 accelerates is very brief. For example, in about 4/8 milliseconds the ram travels from 0.12/0.25 inch while the load beam has a displacement of 0.06/0.09 inch. During this stage load transfer does not occur. Load transfer is, in fact, what causes beam acceleration to end. Most of the load experienced by each punch 13 is absorbed in the deceleration of the ram. However, ram deceleration is far smaller than beam acceleration because the mass of the ram and the parts attached to it is at least five times as large as the mass of the load beam, lever assemblies, connecting rods, etc. Moderate load is applied to the press crankshaft (not shown) as the ram velocity reduces below its normal value.

Figure 4:
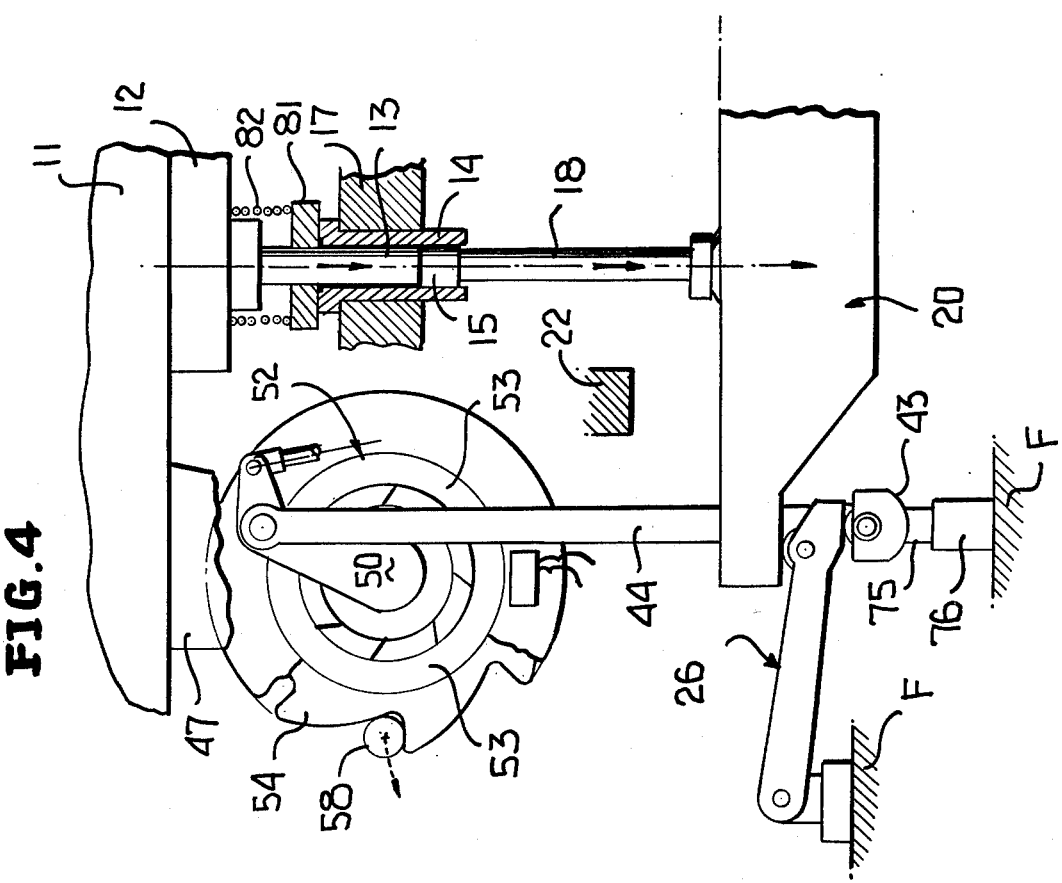
FIG. 4 is a schematic view similar to FIG. 2 showing the press arriving at the bottom dead center position thereof.

In FIG. 4 the press is illustrated as approaching the bottom of its downstroke. The connecting rods 44 and cranks 50 remain in the same positions as shown in FIG 3. The container forging is virtually complete, and the base portions 43 of the connecting rods 44 are nearing contact with the bottom stops 75. Disengagement of the lock-rollers 58 is about to occur.

At this time it is pointed out that the outer race 53 of each sprag clutch 52 is provided with a disc brake 83 which may be automatically actuated in accordance with the position of the ram 11 or the load beam 20. At this time the disc brake 83 is applied.

As the press passes through its bottom dead center position, FIG. 5, the lock-rollers 58 disengage and hence no longer prevent rotation of the outer race of the respective sprag clutch. The spring-packs 78, which have been maintained in a compressed state throughout the forging, can now return to their initial conditions. Since the upper ends of the spring-packs cannot move, being constrained by the respective pads 15, container bottom and punch 13, the lower end of each spring-pack drives downwardly, pushing the load beam and connecting rod base portions into the bottom stops 75 and thereby actuating the energy absorbers or shock absorbers 76. The downward motion of the connecting rods 44 causes clockwise rotation of the cranks and inner races of the sprag clutches. However, this direction of rotation of the drive direction and therefore the outer races of the clutches and the lock-wheels are also caused to rotate.

Although each spring pack 78 has been compressed relatively little during container forging, for example on the order of 0.15 inch, the load is very high because of the heavy initial pre-load. The total energy released during recovery of the spring-packs, load beam, connecting rods and other elastically loaded members is therefore moderate. However, because the force is high, release of this energy occurs very rapidly. The load beam 20 drives sharply downward and simultaneously an impulsive rotation of each entire crank-/sprag clutch/lock-wheel assembly occurs. Rapid removal of forging force is a necessity because of the upstroke is beginning. If a high force is present as the punch begins to withdraw, the respective pad will follow and deform the container.

The displacements of the load beam, connecting rods and cranks are small, the bottom stop-energy absorber brings them to a halt after movement of less than 0.5 inch. The rotational displacement of the clutch outer race, lock-wheel and the disc of the disc brake 83 is permitted to be much greater. There are two reasons for this: (1) as a consequence of the linkage geometry, and the relative masses and moments of inertia of the various members involved, about 80% of the elastic energy released following lock-roller disengagement is transformed into rotational kinetic energy of the sprag clutch outer race, lock-wheel, and brake disc; and (2) overrunning of the outer race simplifies control of the operation which takes place during the press upstroke. Therefore, a pressure setting is selected for the disc brake which allows rotation to continue throughout the upstroke. The outer race may undergo almost two full revolutions during this time.

In FIG. 6 the upstroke of the ram has proceeded to the point where each punch has withdrawn from the formed container C and the valve 71 has been repositioned so that the fluid cylinder forces P have been reapplied, initiating rising of the pads 15. The outer races of the sprag clutches, lock-wheels, etc. continue to revolve in a clockwise direction. As a result of the upward motion of the ram 11, the cranks 50 have been rotating in a clockwise direction. It is to be noted that if the outer races of the sprag clutches have been stopped, or slowed excessively, by the disc brakes 83 prior to this time, the cranks 50 could not have undergone the rotation required by the upstroke motion of the press. The load beam, and hence also the pads, would have been raised prematurely by the ram.

In FIG. 7 there is illustrated the completion of the pad rise. In this figure the connecting linkage between the load beam and the ram has a configuration which would result if the average speed of pad rise was roughly the same as that of the ram. It is to be noted that there is very little difference between the linkage position of FIG. 6 and FIG. 7. Rotation of the outer races of the sprag clutch will continue during the remainder of the upstroke of the ram, ending at about the time the lock-rollers 58 begin to engage the lock-wheels for the next cycle.

The press is now ready for the next complete cycle of operation after the formed containers C have been removed.

Although only a preferred embodiment of the press structure and load transfer system has been specifically illustrated and described herein, it is to be understood that minor variations may be made therein without departing from the spirit and scope of the invention as defined by the appended claims.

I claim:

1. For use in combination with a press of the type including a movable ram, a punch carried by said ram for movement therewith, and a die cooperable with said punch; a load transfer system for transferring a working load to said ram as a working force; said load transfer system comprising a load beam movable between a first position and a second position, a pad carried by said beam and movable within said die in cooperation with said punch, at least one lever at each end of said load beam pivotally mounted for swinging about a fixed pivot axis in response to movement of said load beam, and a load transferring linkage operatively connected to each lever and having means for connection to said ram to move said ram in response to movement of said load beam by said pad.

2. An apparatus in accordance with claim 1 wherein the connection between each lever and said load beam and said load transferring linkage is a movement multiplying connection.

3. An apparatus according to claim 1 together with a fixed stop for defining said load beam first position and an energy absorbing assembly for defining said load beam second position.

4. An apparatus according to claim 1 together with a compressible resilient connection between said pad and said load beam.

5. An apparatus according to claim 1 together with a compressible resilient connection between said pad and said load beam permitting limited movement of said pad toward said load beam.

6. An apparatus in accordance with claim 1 wherein the connection between each lever and said beam and said load transferring linkage is a movement multiplying connection wherein said load transferring linkage moves at a greater rate than said load beam.

7. An apparatus according to claim 6 wherein said system is particularly adapted to a usage wherein a slug is progressively reduced in thickness and said punch gradually approaches said pad, and the relative rates of movement of said load transferring linkage and said load beam is in accordance with the rates of movement of said punch and said pad.

8. An apparatus in accordance with claim 6 wherein each lever has a first load transfer point between said load beam and that lever and a second load transfer point between that lever and said load transferring linkage, and said second load transfer point is located further from that lever pivot axis than said first load transfer point.

9. An apparatus according to claim 8 wherein there are means for adjusting the relative spacing of said first and second load transfer points to vary the relative rates of movement of said load beam and said load transferring linkage.

10. An apparatus according to claim 8 wherein said first load transfer point is defined by a follower carried by that lever and engageable with a surface on said load beam and said second load transfer point is defined by a follower carried by said load transferring linkage and a surface on that lever.

11. An apparatus according to claim 10 wherein there are means for adjusting the relative spacing of said first and second load transfer points to vary the relative rates of movement of said load beam and said load transferring linkage.

12. An apparatus according to claim 10 wherein means restrain said load transferring linkage roller for movement along a fixed path, and there are means for adjusting the position of said pivot axis of that lever toward and away from said fixed path to vary the relative rate of movement of said load beam and said load transferring linkage.

13. An apparatus according to claim 1 wherein said load transferring linkage includes a lost motion connection for permitting movement of said ram without movement of said load beam when said punch is out of association with said pad.

14. An apparatus according to claim 13 wherein said lost motion connection includes a rotary crank and a one-way overrunning clutch connection.

15. An apparatus according to claim 13 wherein said lost motion connection includes a rotary crank and a lock wheel connection.

16. An apparatus according to claim 13 together with means for eliminating slack in said lost motion connection.

17. An apparatus according to claim 13 wherein said lost motion connection includes a rotary crank and a lock wheel connection with there being an overrunning clutch between said crank and said lock wheel.

18. An apparatus according to claim 17 together with means for selectively locking said lock wheel against rotation.

19. An apparatus according to claim 17 together with means for applying a rotational force on said crank during movement of said ram without movement of said load beam.

20. A force applying assembly for a forging press comprising a first member and a second member, means mounting said first member for movement toward said second member, means mounting said second member for movement away from said first member, and first means connecting said second member to said first member for movement by said first member, and second means connecting said first member to said second member for effecting movement of said first member at a different rate from that of said second member.

21. A force applying assembly according to claim 20 wherein said second means includes linkage for effecting a faster movement of said first member than said second member.

22. A force applying assembly according to claim 20 wherein said second means includes linkage for effecting a faster movement of said first member than said second member, said linkage including a movement multiplying lever.

23. A method of effecting a force multiplication in a forging press comprising the steps of providing a moving ram and a movable load beam opposing the ram, interconnecting the ram with the load beam, and providing a movement multiplier for effecting movement of the ram by the load beam at a rate greater than the movement of the load beam by the ram.

24. The method of claim 23 wherein said ram and said load beam are provided with opposed tooling receiving a compressible workpiece therebetween.

* * * * *